(12) United States Patent
Tigner

(10) Patent No.: US 6,208,480 B1
(45) Date of Patent: Mar. 27, 2001

(54) CIRCUIT AND METHOD FOR MAINTAINING A ROTATION POSITION REFERENCE ON A DISC DRIVE WITH A STAGGERED SERVO FORMAT

(75) Inventor: Stephen C. Tigner, Maple Grove, MN (US)

(73) Assignee: Seagate Technology LLC, Scotts Vally, CA (US)

( * ) Notice: Subject to any disclaimer, the term of this patent is extended or adjusted under 35 U.S.C. 154(b) by 0 days.

(21) Appl. No.: 09/172,693

(22) Filed: Oct. 14, 1998

Related U.S. Application Data

(60) Provisional application No. 60/062,165, filed on Oct. 16, 1997.

(51) Int. Cl.⁷ .............................. G11B 15/12; G11B 5/09
(52) U.S. Cl. ................................................ 360/63; 360/51
(58) Field of Search .......................... 360/51, 63, 77.08

(56) References Cited

U.S. PATENT DOCUMENTS

| 4,807,063 | 2/1989 | Moteki ................................ 360/77.07 |
| 4,809,120 | 2/1989 | Ozawa ................................ 360/78.14 |
| 4,896,228 | 1/1990 | Amakasu et al. .................. 360/77.08 |
| 4,924,160 | 5/1990 | Tung .................................... 318/561 |
| 5,132,854 | 7/1992 | Tsuyoshi et al. .................. 360/78.14 |
| 5,307,218 | 4/1994 | Kitamura et al. ................. 360/77.08 |
| 5,321,564 | 6/1994 | Takahashi et al. ................ 360/77.04 |
| 5,477,402 | 12/1995 | Elliott et al. ...................... 360/77.08 |
| 5,818,654 | * 10/1998 | Reddy et al. .......................... 360/53 |

FOREIGN PATENT DOCUMENTS 1-106375   4/1989   (JP) .

* cited by examiner

Primary Examiner—W. Chris Kim
(74) Attorney, Agent, or Firm—Westman, Champlin & Kelly, P.A.

(57) ABSTRACT

A data storage apparatus is provided in which the multiple disc surfaces for a disc stack are divided into multiple rotationally spaced apart servo frames. Servo data is written on the multiple disc surfaces within radially extending servo spokes such that each disc surface includes one servo spoke within each servo frame. Within each particular servo frame the servo spokes on each of the multiple disc surfaces are offset rotationally from one another. In addition, servo control circuitry and a method of using the same to provide positional reference signals for the staggered servo format are disclosed.

18 Claims, 9 Drawing Sheets

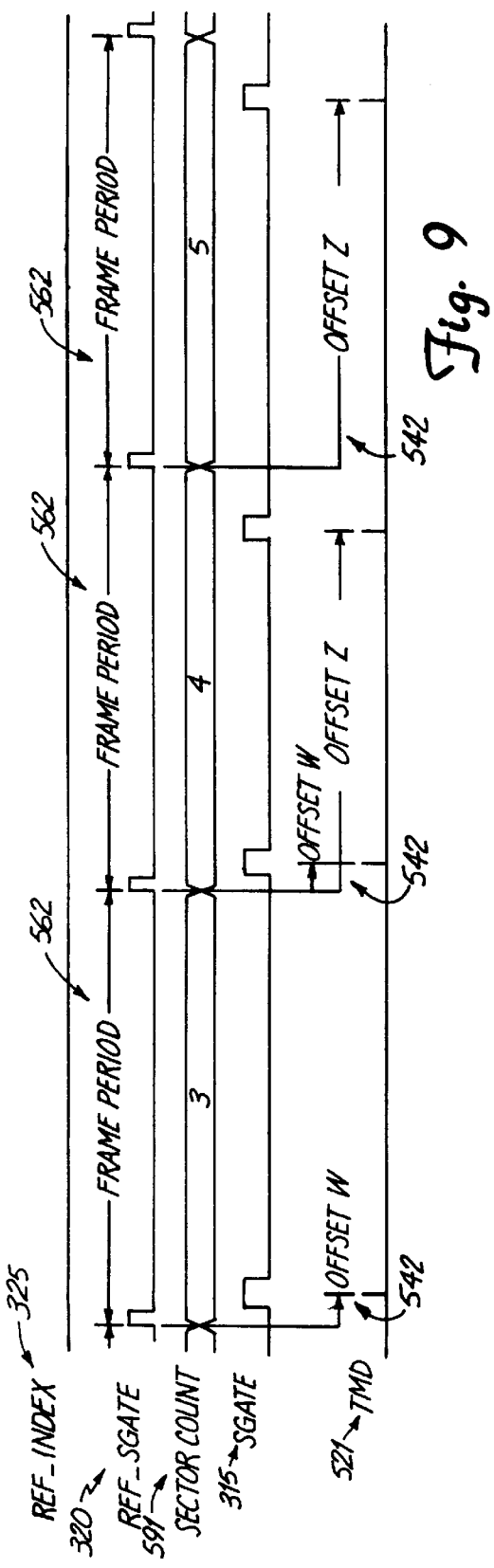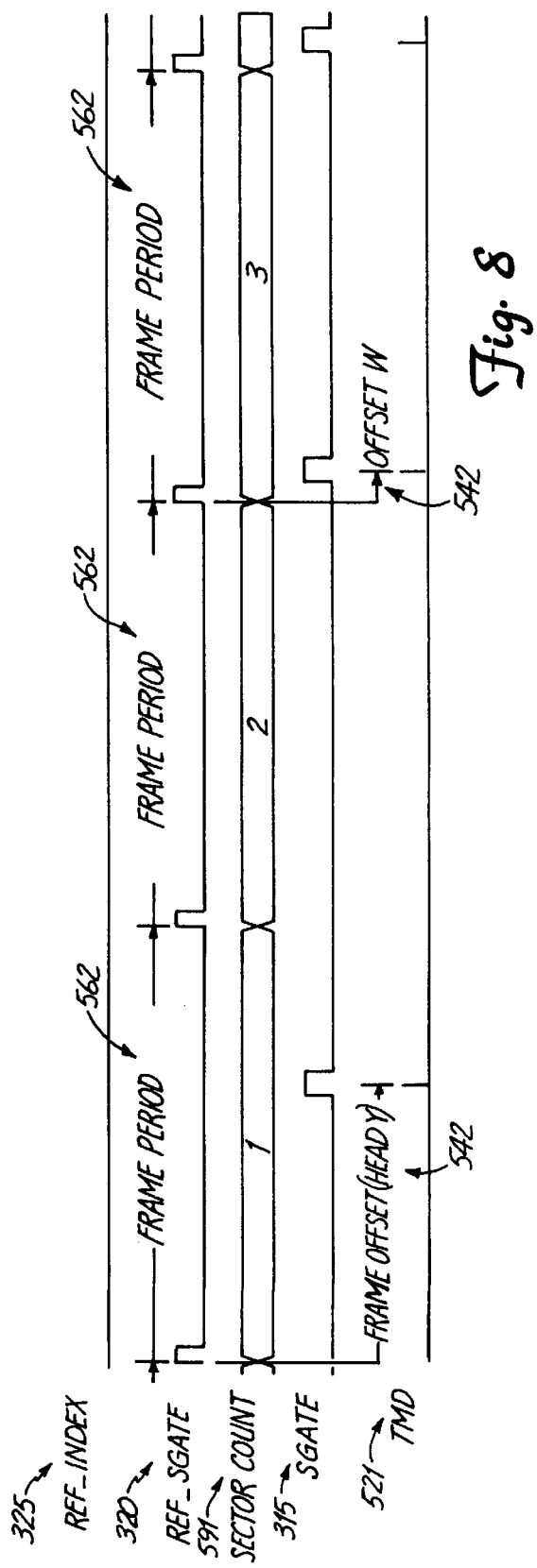

CIRCUIT AND METHOD FOR MAINTAINING A ROTATION POSITION REFERENCE ON A DISC DRIVE WITH A STAGGERED SERVO FORMAT

BACKGROUND OF THE INVENTION

The present application claims the benefit of earlier filed U.S. Provisional Application Ser. No. 60/062,165, entitled CIRCUIT AND METHOD FOR MAINTAINING A ROTATION POSITION REFERENCE ON A DISC DRIVE WITH A STAGGERED SERVO FORMAT, filed on Oct. 16, 1997.

The present invention relates generally to disc drive data storage systems. More particularly, the present invention relates to circuits and methods for maintaining a rotation position reference on a headerless format disc drive.

In a headerless disc drive, header information is not available to identify unique sectors around the surface of the discs. Therefore, a constant rotational position reference is required by the controller to determine the location of a desired data sector. Servo information is written in spokes around the surface of the disc, and detection of this servo information can be used to provide a rotational position reference.

When data to be written to or read from a different disc surface than is currently being accessed, a "head switch" occurs. The timing of the servo information can shift during these head switches, and consequently multiple detections of servo information can be missed for the same rotational position. In order to obtain a constant rotational position reference, which is necessary to consistently identify the correct disc sector after a head switch occurs, it can sometimes be necessary to wait until the next INDEX mark data pattern is detected to become re-orientated. Since the INDEX mark data pattern is written at only one position on each disc, this method of re-orientating after a head switch can result in significant delay, as the discs may have to go through a complete rotation prior to detection of the INDEX mark data pattern.

The present invention provides a solution to this and other problems, and offers other advantages over the prior art.

SUMMARY OF THE INVENTION

The present invention relates to headerless format data storage systems and apparatus, such as disc drive data storage systems, which include a circuit and method for maintaining a rotation position reference.

In accordance with one embodiment of the invention, a data storage apparatus is provided in which the multiple disc surfaces of a disc stack are divided into multiple rotationally spaced apart servo frames. Servo data is written on the multiple disc surfaces within radially extending servo spokes such that each disc surface includes one servo spoke within each servo frame. Within each particular servo frame the servo spokes on each of the multiple disc surfaces are offset rotationally from one another. In addition, servo control circuitry and a method of using the same to provide positional reference signals for the staggered servo format are disclosed.

These and various other features as well as advantages which characterize the present invention will be apparent upon reading of the following detailed description and review of the associated drawings.

BRIEF DESCRIPTION OF THE DRAWINGS

FIGS. 6–9 are timing diagrams illustrating preferred methods of operation of the servo control circuitry of the present invention.

DETAILED DESCRIPTION OF THE PREFERRED EMBODIMENTS

Figure 1:
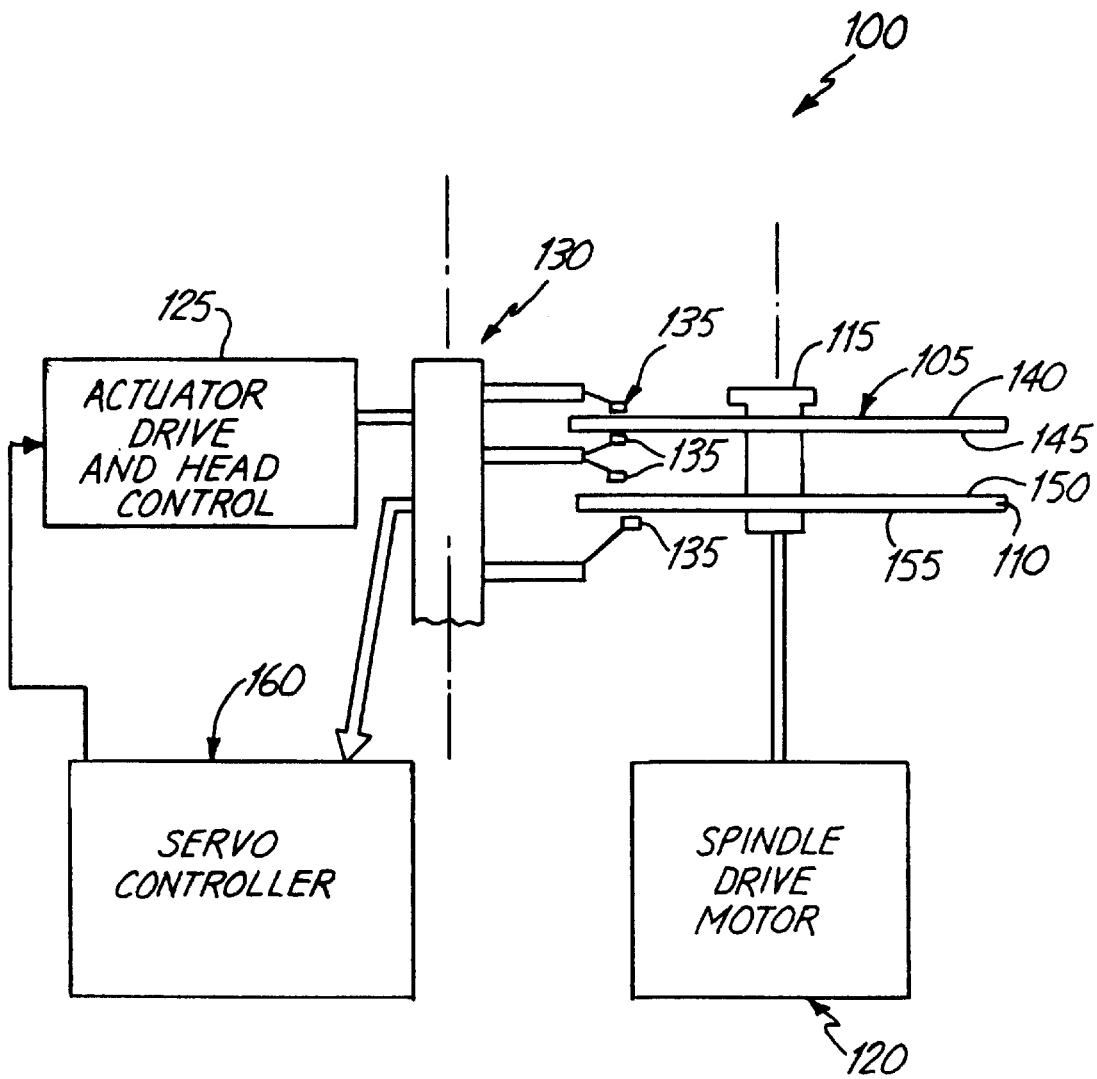
FIG. 1 is a block diagram of a headerless format data storage system in accordance with the present invention.

Referring now to FIG. 1, data storage system or apparatus 100 is shown. FIG. 1 is a diagrammatic illustration of a headerless format disc drive 100 which includes a servo sector format and a servo controller both in accordance with preferred embodiments of the present invention. As illustrated, disc drive 100 includes discs 105 and 110 mounted on spindle 115. During rotation of spindle 115 and discs 105 and 110 by spindle drive motor 120, actuator drive and head control circuit 125 controls movement of actuator assembly 130 to position data heads 135 over desired positions on disc surfaces 140, 145, 150 and 155. Depending upon which of disc surfaces 140, 145, 150 and 155 is to be written to or read from, a selected one of data heads 135 reads/writes data from/to the desired disc surface.

Data stored on disc surfaces 140, 145, 150 and 155 in disc drive 100 includes servo information written in spokes on each of these disc surfaces. The signal read from the corresponding disc surfaces therefore contains servo information which is used by servo controller 160 to maintain a rotational position reference. The rotational reference is necessary to accurately control which locations on the disc surfaces are read from or written to. The format in which the servo data is stored upon the disc surfaces, as well as the implementation of servo controller 160, are described in greater detail with reference to FIGS. 2–10. It must be understood that, while disc drive 100 is illustrated with two discs and specific circuit functions or components, disc drive 100 can include more or less discs and other circuitry.

Figure 2:
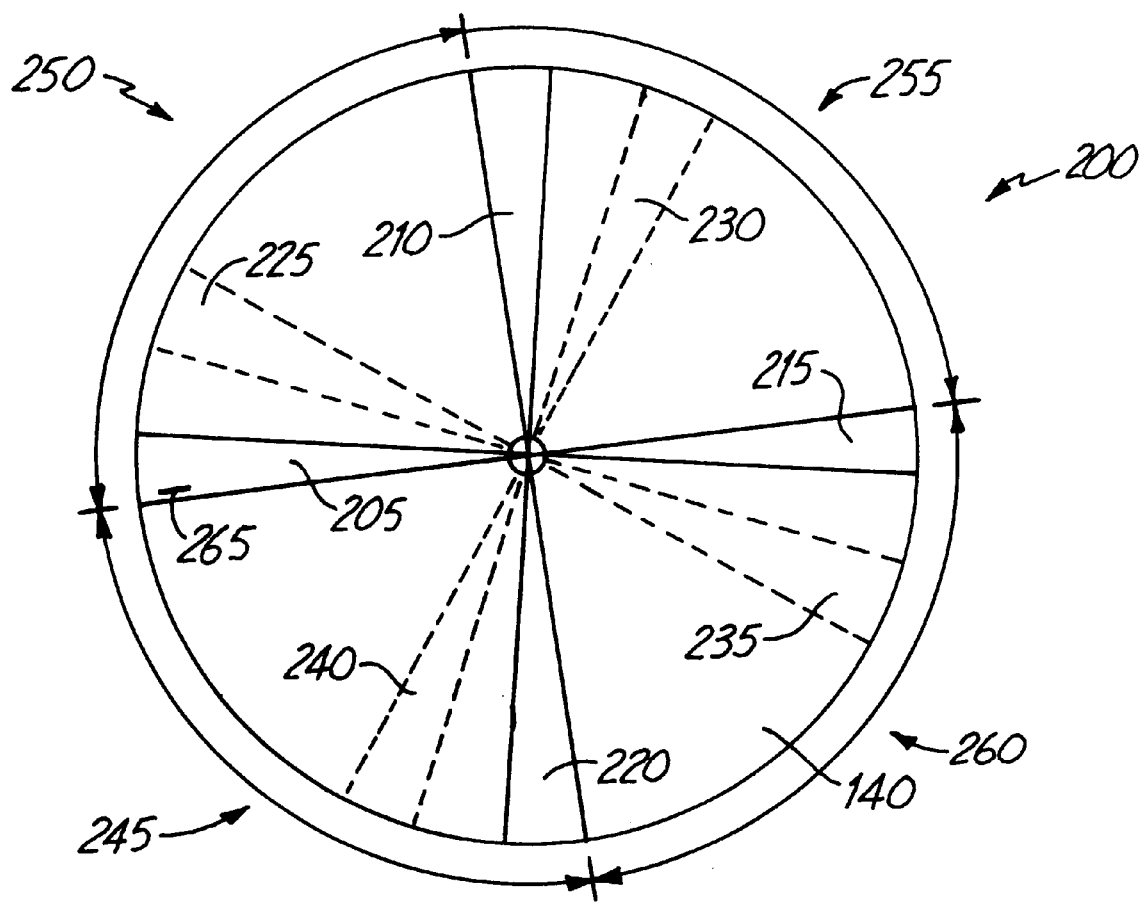
FIG. 2 is a diagrammatic top view of a disc stack having a staggered servo format in accordance with the present invention.

FIG. 2 is a top diagrammatic view illustrating disc stack 200 utilizing a staggered servo format in accordance with preferred embodiments of the present invention. Disc stack 200 includes, for example, discs 105 and 110 having disc surfaces 140, 145, 150 and 155 as illustrated in FIG. 1. Servo information is written in spokes around the surfaces of the discs. In the example illustrated in FIG. 2, each disc surface includes four servo spokes. However, in an actual implementation, each disc surface would contain significantly greater than four servo spokes, and the size of each spoke would be greatly less than the size shown in FIG. 2.

First disc surface 140 is illustrated as having servo data stored in spokes 205, 210, 215 and 220. In order to minimize the time it takes to write the servo tracks on a multiple head disc drive, the rotational position of the servo spokes is skewed from one disc surface to the next disc surface. This is illustrated in FIG. 2 by servo spokes 225, 230, 235 and 240. These servo spokes, which are illustrated using dashed lines, correspond for example to second disc surface 145 illustrated in FIG. 1.

The distance (or time in a servo read signal) from the beginning of one servo spoke on a disc surface to the beginning of the next servo spoke on the same disc surface constitutes a servo sector or frame. As illustrated in FIG. 2, disc stack 200 includes servo frames 245, 250, 255 and 260. In an actual disc drive, the circumference of the disc stack would normally be divided into considerably more than four servo frames. Each servo frame of disc stack 200 will include one servo spoke on each disc surface. For example, as illustrated servo spokes 220 and 240 are both positioned within servo frame 245. In the four disc surface drive illustrated in FIG. 1, servo frame 245 would typically also include two additional servo spokes. An INDEX mark data pattern 265 is written at only one rotational position on each disc surface. Reading the INDEX mark data pattern, which is illustrated diagrammatically in FIG. 2, provides an absolute position reference once each rotation of the discs.

Because of the rotational skew used to store servo information on the various disc surfaces of disc stack 200, when a head switch occurs, the timing of the servo information shifts. As a result, there may be missing or multiple detection's of the servo information on the disc surface switched to, for the same rotational position. The servo controller 160 of the present invention generates constant rotational position references which help to consistently identify the correct servo spoke and frame after a head switch occurs, without having to wait until detection of INDEX mark data pattern 265 in order become re-orientated.

Figure 3:
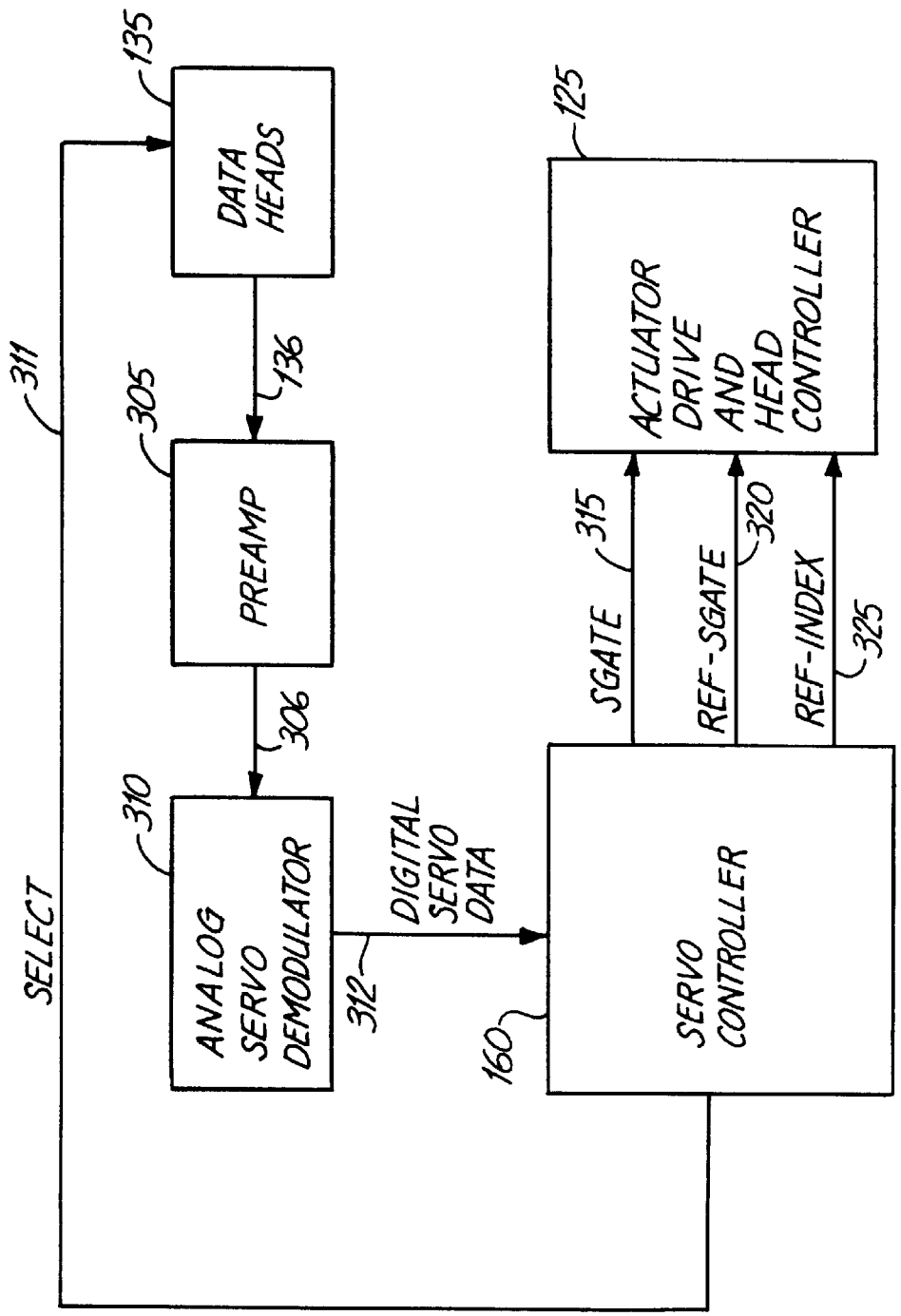
FIG. 3 is a block diagram illustrating in greater detail portions of the data storage system illustrated in FIG. 1.

FIG. 3 is a block diagram illustrating portions of the circuitry of disc drive 100 in greater detail. As illustrated in FIG. 3, the circuitry of disc drive 100 includes data heads 135 preamplifier 305, analog servo demodulator 310, servo controller 160 and actuator drive and head controller 125. Depending upon which of data heads 135 is selected by serve controller 160 using SELECT Line 311, the corresponding data head provides read signal 136 which is indicative of servo and other data read from the corresponding disc surface. After amplification by preamplifier 305, demodulator 310 demodulates amplified signal 306 to provide DIGITAL SERVO DATA signals 312. Using DIGITAL SERVO DATA signals 312; servo controller 160 generates SGATE signal 315, Ref-SGATE signal 320, and Ref-INDEX signal 325.

SGATE signal 315 is a signal which provides an indication to controller 125 of when the data being read by data head 135 is servo data. In other words, it identifies when a data head is reading from a servo spoke. Ref-SGATE signal 320 is a signal which provides controller 125 a constant servo frame counter pulse, regardless of head switches. Ref-INDEX signal 325 is a signal which provides controller 125 with a constant rotational position reference pulse which occurs once per revolution of the discs. Using SGATE signal 315, Ref-SGATE signal 320 and Ref-INDEX signal 325, controller 125 controls actuator assembly 130 to accurately position data heads 135 over the corresponding disc surfaces. Generation of SGATE signal 315, Ref-SGATE signal 320 and Ref-INDEX signal 325 is discussed in greater detail with reference to FIGS. 4–10.

Figure 4:
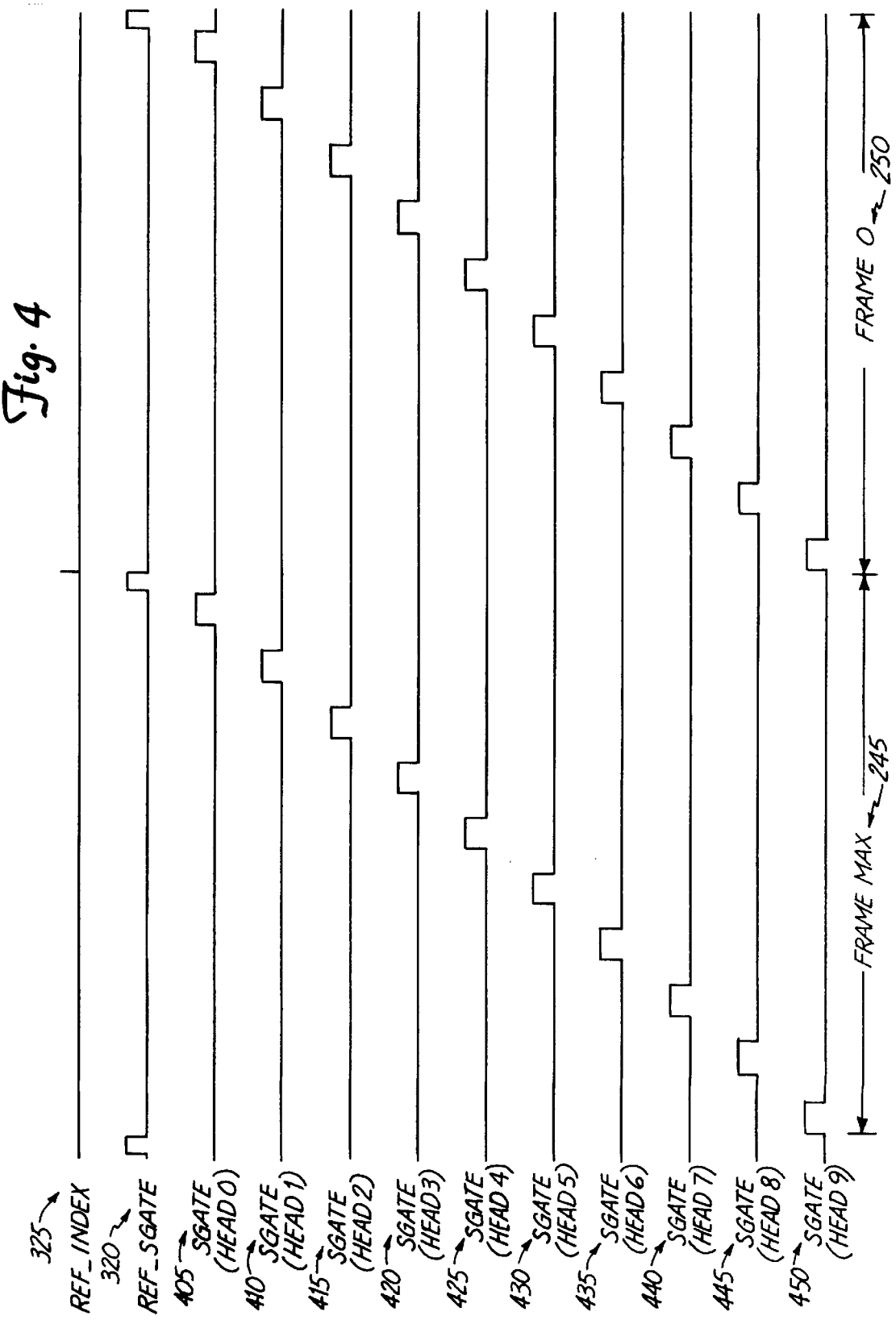
FIG. 4 is a timing diagram illustrating methods of operation of servo control circuitry in accordance with the present invention.

Servo controller 160 implements frame logic which generates the SGATE signal 315, the Ref-SGATE signal 320 and the Ref-INDEX signal 325. Illustrated in FIG. 4 are the Ref-INDEX signal 325, the Ref-SGATE signal 320, and the SGATE signal 315 for two consecutive sectors or frames 245 and 250. For illustrative purposes, the SGATE signal 315 is shown as individual waveform components from each of ten head/disc surface combinations. Servo controller 160 provides these signals to head controller 125 for implementation of I/O functions related to head control.

Ref-SGATE signal 320 and Ref-INDEX signal 325 are used by controller 125 in the headerless drive to maintain a sector or frame count. The servo data written on each surface is skewed from head to head as shown by the SGATE waveforms in FIG. 4. SGATE signals 405, 410, 415, 420, 425, 430, 435, 440, 445 and 450 correspond to serve data for ten disc surface/head combinations(numbered 0 through 9). The ten surface/head combinations shown is an example and is not limiting to the invention. The servo data for all of the heads for a given rotational spoke are located within the same servo frame. Ref-SGATE signal 320 provides a reference signal that remains constant regardless of head switches, thereby defining the servo frame boundary. A servo frame 245 extends from one occurrence of a Ref-SGATE signal pulse to the next occurrence of a Ref-SGATE signal pulse. The pulse in the Ref-INDEX signal 325 occurs only on the trailing edge of Ref-SGATE for the first servo frame (servo frame 250 as illustrated).

Figure 5:
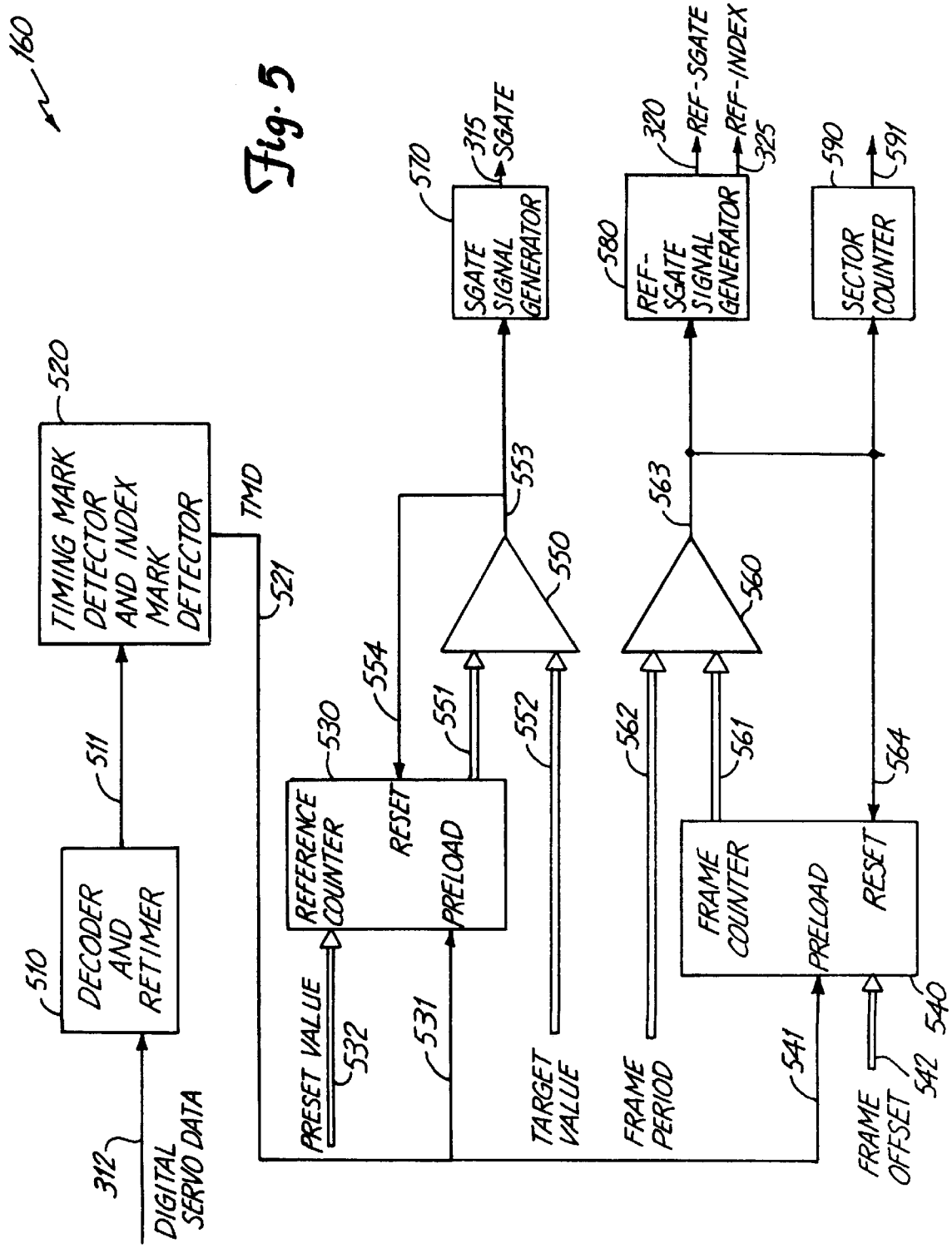
FIG. 5 is a block diagram illustrating one more particular embodiment of the servo control circuitry of the present invention.

FIG. 5 is a block diagram illustrating one preferred embodiment of servo controller 160 in accordance with the present invention. As illustrated in FIG. 5, controller 160 includes decoder and retimer 510, timing mark detector (TMD) 520, reference counter 530, frame counter 540, comparators 550 and 560, SGATE signal generator 570, Ref-SGATE signal generator 580 and sector counter 590. Decoder and retimer 510 receives digital servo data 312 as an input and provides as an output decoded and retimed servo data stream 511. TMD 520 detects timing mark data patterns or sync fields located within each servo spoke. Upon detection of a timing mark sync field in a servo spoke, TMD 520 generates a TMD output pulse on signal line 521.

Counter 530 is clocked by a crystal clock (not shown) and counts upward from zero after a reset pulse is received at reset input 554. The count value output of counter 530 is provided at output 551. TMD output 521 is provided to preload input 531 of reference counter 530. Upon detection of a timing mark at preload input 531, the count of reference counter 530 provided at output 551 is updated to a PRESET VALUE provided to counter input 532. The PRESET VALUE is a value which is a constant regardless of which head is reading or writing, and which represents the expected time or clock count between the beginning of an SGATE signal pulse and detection of the next timing mark which will also be provided to counter 530 at preload. input 531.

The count value provided by counter 530 at output 551 is input into comparator device 550 which Compares the count value to a TARGET VALUE provided at input 552. The TARGET VALUE is a targeted count from the detection of the previous servo spoke or burst to detection of the next servo spoke. In other words, the TARGET VALUE is a targeted time between SGATE signals. Each time the court provided at counter output 551 reaches or exceeds the TARGET VALUE provided at input 552, comparator 550 generates an output pulse at output 553 which resets counter 530, thus bringing the count value at output 551 back to zero. The output pulse is also provided to SGATE signal generator 570, which in response provides a uniform width SGATE pulse at output 315. As is discussed below in greater detail the TARGET VALUE provided an input 552 is varied temporarily after a head switch so that the reference counter 530, comparator 550 and SGATE signal generator remain in sync during head switches.

Frame counter 540 is clocked by a crystal. clock (not shown) and counts upward from zero after a reset pulse is received at reset input 564. The counter output is provided at output 561. TMD output 521 is provided to preload input 541 of flame counter 540. Upon detection of a timing mark at preload input 541, the count of frame counter 540 provided at output 561 is updated to the FRAME OFFSET value provided at counter input 542. The FRAME OFFSET defines the expected offset time or count of the Ref-SGATE signal pulse from timing mark detection in the servo field. The FRAME OFFSET therefore differs from head to head and must be updated when a head switch occurs in order for frame counter 540, comparator 563 and Ref-SGATE signal generator 580 to remain in sync during a head switch.

The count value provided by frame counter 540 at output 561 is input into comparator device 560 which compares the count value to a FRAME PERIOD value provided at input 562. The FRAME PERIOD is a targeted count from the beginning of a frame to the end of the frame. Since the size of each frame remains constant regardless of which head is reading/writing, the frame period value is a constant which is normally set, on power-up or demodulator resynchronization, to a nominal value. Each time the court provided at counter output 561 reaches or exceeds the FRAME PERIOD provided at input 562, comparator 560 generates an output pulse at output 563 which resets counter 540, thus bringing the count value at output 561 back to zero. The output pulse is also provided to Ref-SGATE signal generator 580, which in response provides a uniform width Ref-SGATE pulse at output 320. Signal generator 580 or other dedicated circuitry or software also generates the Ref-INDEX signal 325 once per rotation of disc stack 200, as can be determined by counting the number of ref-SGATE signal pulses to determine the number of frames which have occurred since the last ref-INDEX signal. The output pulse from comparator output 563 is also provided to sector counter 590 which increments its count 591 of the number of sectors or frames.

Figure 6:
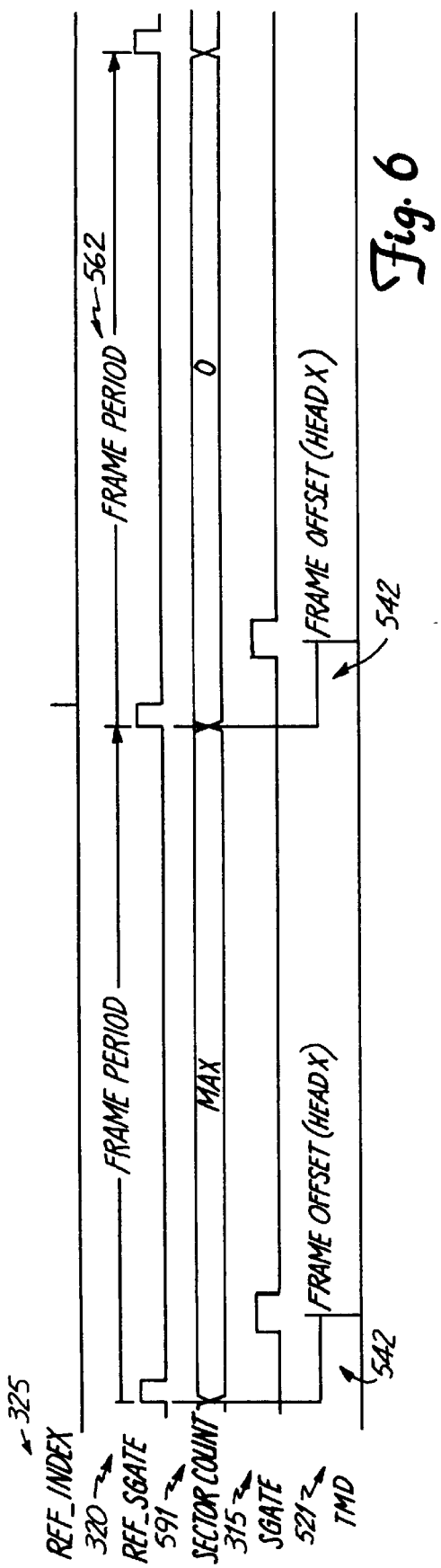

As discussed above, there are two parameters for controlling the frame logic, the FRAME PERIOD provided at input 562 to comparator function 560, and the FRAME OFFSET provided at input 542 of frame counter 540. The FRAME PERIOD is normally set, on power-up or demodulator resynchronization, to its nominal value. The FRAME OFFSET defines the offset of the Ref-SGATE signal from timing mark detection in the servo field by TMD 520. The frame counter 540 is synchronously loaded with the FRAME OFFSET value at timing mark detection to adjust the count for motor speed variations. The FRAME OFFSET value will change from head to head. The sector counter is incremented on the rising edge of Ref-GATE. After reaching its predetermined maximumn count MAX, sector counter 590 resets to zero. These relationships are illustrated in the timing diagram of FIG. 6. As illustrated in FIG. 6, in this mode, there is one and only one Ref-SGATE signal 320 per sector or frame, regardless of head switches.

Figure 7:
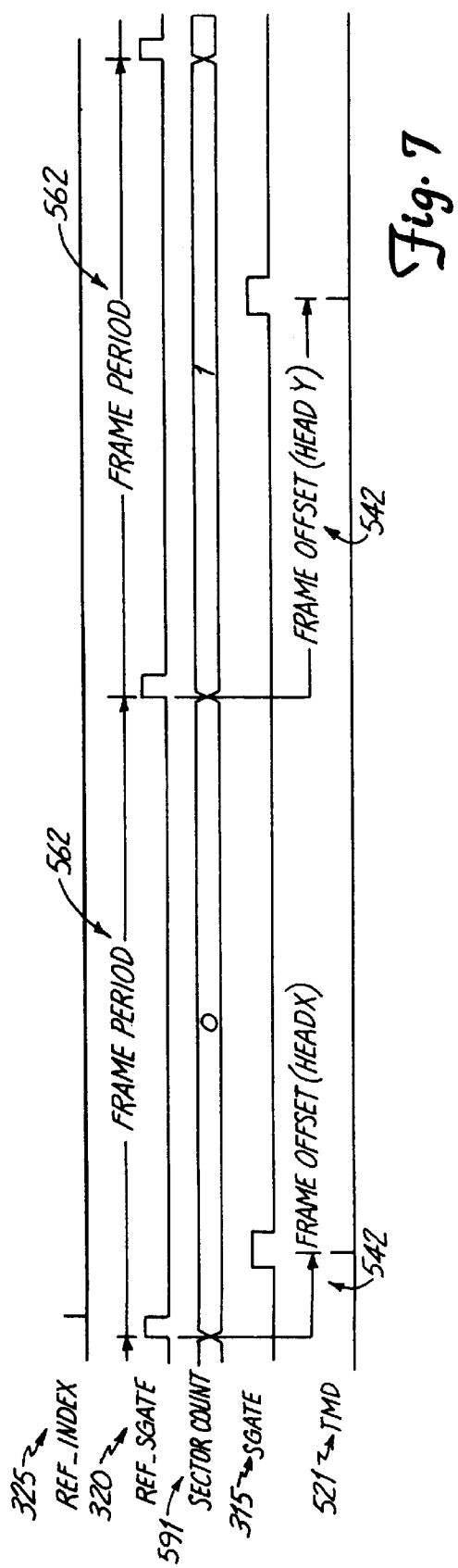

FIG. 7 illustrates the timing during a head switch. As illustrated, as a result of the head switch from a first head (head X for example) to a new head (head Y for example), a new FRAME OFFSET value 542 is loaded to adjust the timing of Ref-SGATE signal 320 with respect to the servo data on ten new head. The FRAME PERIOD value 562 remains constant.

FIG. 8 illustrates the case of a skipped pulse on SGATE signal 315 in the second illustrated frame period 562 due to a head switch. The skipped SGATE, pulse occurs because the servo data of the next head is too close in time to the servo data of the previous head. The servo controller 160 sets the TARGET VALUE 552 provided as an input to reference counter 530 extra long to skip the first servo burst and recover the second. In this case, the counter continues to count without adjustment for one servo frame since no timing mark was detected. The sector counter 590 increments the sector or frame count 591 correctly and the frame counter 540 is updated correctly when the second servo burst on the new head is detected.

FIG. 9 illustrates the case of multiple pulses on SGATE signal 315 generated in a single servo frame 562. In this case the servo data for the new head in the same servo frame is far enough out that it can be recovered. The servo controller sets the TARGET VALUE 552 small or short, in order to get the next servo data. The new FRAME OFFSET value 542 is loaded before the servo data of the next head is expected. Since two servo bursts are detected for one servo frame, the frame counter actually is adjusted twice, once each time the timing marks are detected. Even though there are two pulses on SGATE signal 315 for this frame, the frame or sector count 591 at counter 590 is kept accurate.

Figure 10:
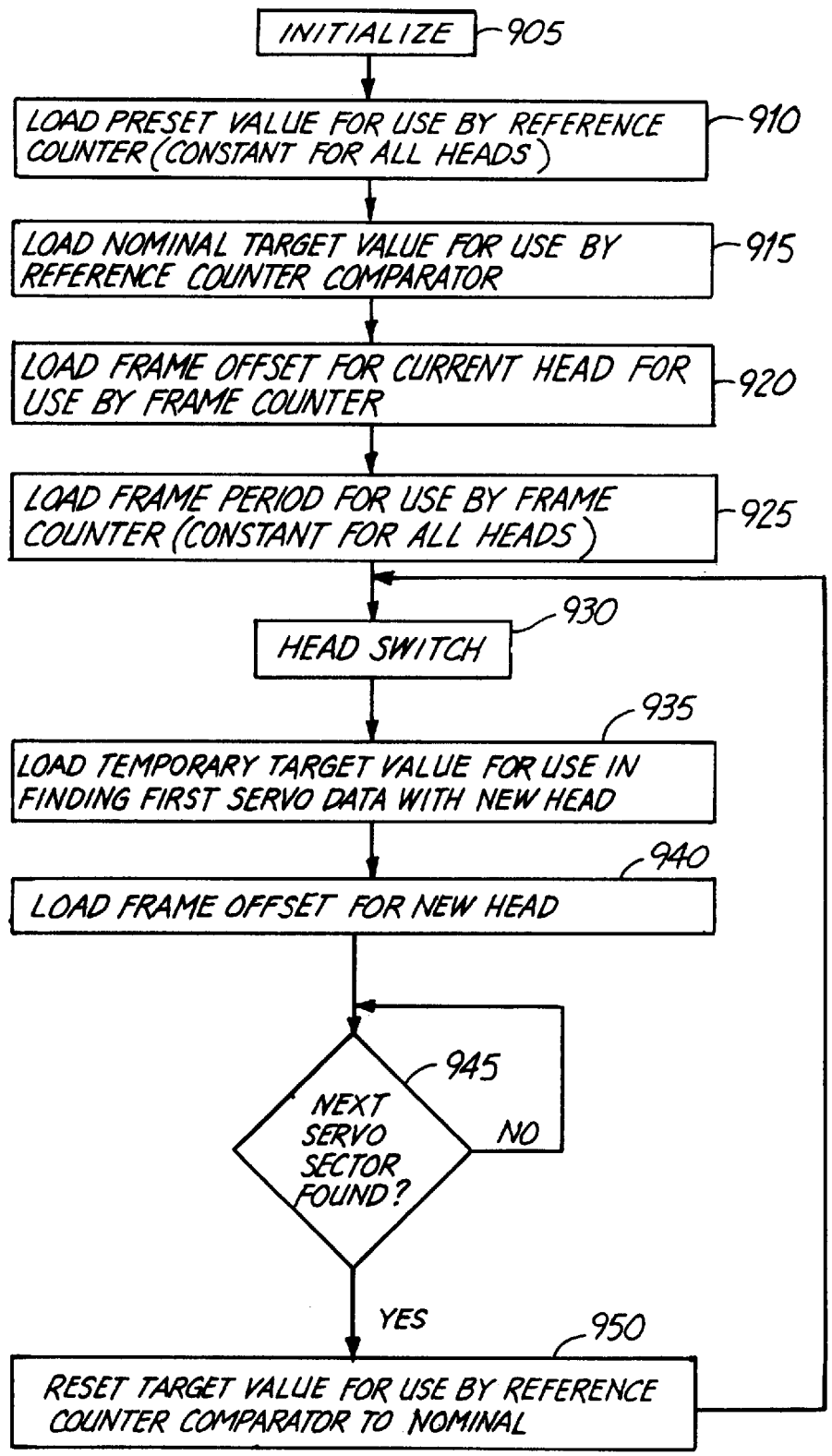
FIG. 10 is a flow diagram illustrating one preferred method of using the servo control circuitry of the present invention to read servo data after a head switch occurs.

FIG. 10 is a flow diagram illustrating preferred methods of maintaining servo reference signals during a head switch in accordance with the present invention. At initialization as illustrated at block 905, the constant PRESET VALUE for the reference counter is loaded as shown at block 910. The variable TARGET VALUE for the reference counter comparator is loaded for the corresponding data head as shown at block 915. The variable FRAME OFFSET value for the frame counter is loaded as shown at block 920. Finally, the constant FRAME PERIOD for the frame counter is loaded as shown at block 925.

Upon a head switch occurrence as illustrated at block 930, a new TARGET VALUE for the next head is loaded for use by the reference counter comparator 550 so that the data for the next data head can be found. This is illustrated at block 935. As illustrated at block 940, a new FRAME OFFSET for the new head is loaded for use by the frame counter 540. As illustrated at decision point 945, it is determined whether the next servo sector has been found. As illustrated at block 950, once the next servo sector has been found, the TARGET VALUE is reset to its original or nominal value for use by the reference counter comparator 550. However, the frame offset is head specific and remains at the new value until another head switch occurs.

Figure 11:
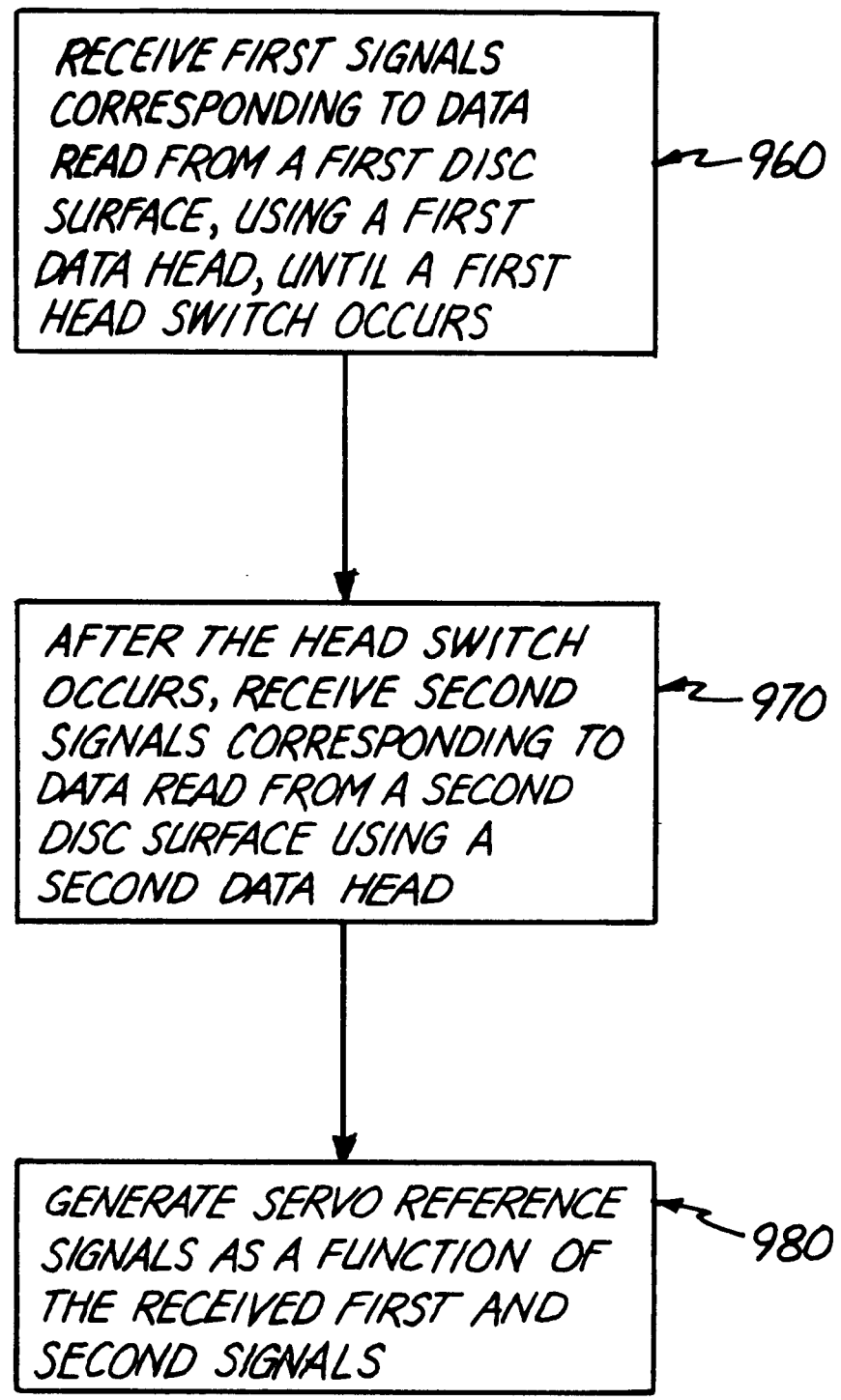
FIG. 11 is a flow diagram illustrating a preferred method of using the servo control circuitry to generate servo reference signals in accordance with the present invention.

FIG. 11 illustrates a method of generating servo reference signals using servo control circuitry 160. At step 960, first signals are received corresponding to data head. Then, at step 980, servo reference signals are generated as a function of the received first and second signals.

In some embodiments, the generating step 980 includes generating with frame counter 540 frame counter output 561 indicative of a number of clock cycles occurring during a current frame. Frame comparator 560 then compares the frame counter output to a frame period value 562, which is constant for all frames, and provides as a frame comparator output 563 a first servo reference signal which is indicative of the boundaries of the current servo frame.

In some embodiments, the generating step 980 includes detecting a timing mark data pattern 265 in either of the first and second signals corresponding to the data read from the first and second disc surfaces. Upon detection of a timing mark data pattern, the frame counter output 561 is set to a frame offset value 542 indicative of an expected offset time between detection of the timing mark data pattern within a servo spoke for a particular disc surface and the generation of the servo reference signal indicative of the boundary of the current servo frame. The frame offset value is different for each disc surface and is updated upon each head switch.

In some embodiments, generating step 980 includes counting with reference counter 530 the number of clock cycles occurring between reading data from a first servo spoke and reading data from a second servo spoke, and providing reference counter output 551 as a function of the counted number of clock cycles between servo spokes. Reference comparator 550 then compares the reference counter output to target value 552, and provides at output 553 a second servo reference signal which is indicative of when data being read by the selected data head is servo data.

The generating step 980 can further include, upon detecting the timing mark data pattern, setting the reference counter output to a preset value received at a preset value input 532 to the reference counter. The preset value is indicative of an expected time between the beginning of a signal pulse in the second servo reference signal and detection of the next timing mark. The preset value provided as an input to the reference counter is preferably a constant for each data head and disc surface combination. The target value 552 provided to the reference counter is a constant nominal value for all head and disc surface combinations. Upon the occurrence of a head switch the target value is changed from the constant nominal value to a variable value until servo data from a servo spoke is read. Once servo data from a servo spoke is read after the head switch the target value is changed back to the constant nominal value.

The present invention can be summarized in reference to the FIGS. which illustrate disc drive 100. As illustrated, a disc stack 200 includes a multiple coaxially arranged data storage discs 105 and 110 providing multiple disc surfaces 140, 145, 150 and 155 on which data is stored in a headerless format. A servo controller 160 provides servo position reference signals indicative of a rotational position on the disc surfaces.

For the disc stack 200, multiple rotationally spaced apart servo frames 245, 250, 255 and 260 are defined. Servo data is written on the disc surfaces within radially extending servo spokes 205, 210, 215, 220, 225, 230, 235 and 240 such that each disc surface includes one servo spoke within each servo frame, and such that within each particular servo frame the servo spokes on each of the, plurality of disc surfaces are offset rotationally from one another. Multiple data heads 135 are supported by an accuator assembly 130 adjacent corresponding disc surfaces. A selected data head reads data from its corresponding disc surface until a head switch occurs. Servo control circuitry 160 provides output signals which are indicative of boundaries of the respective servo frames.

In some embodiments, servo circuitry 160 includes a frame counter 540 which counts clock cycles during a current frame and provides a frame counter output 561 as a function of a number of clock cycles counted during the current frame. A frame comparator 560 compares the frame counter output to a FRAME PERIOD VALUE which is constant for all frames. The frame comparator 560 provides as an output a signal 563 which is indicative of the boundaries of the current frame.

In some embodiments, the frame comparator output 563 is operatively coupled to a frame counter reset input 564 which resets the frame counter 540 when the frame comparator output signal is indicative of an end of the current servo frame and the beginning of the next servo frame. A timing mark detector 520 detects timing marks on the disc surfaces, and in response to detection of a timing mark data pattern in any of the servo spokes, generates a timing mark detection output signal 521. The timing mark detection signal 521 is provided as an input to the frame counter 540 such that upon the detection of a timing mark data pattern the count value of the frame counter provided at the frame counter output 561 is set to a FRAME OFFSET VALUE received at a frame offset input 542 to the frame counter 540. The FRAME OFFSET VALUE is indicative of an expected offset time between detection of the timing mark data pattern within a servo spoke for a particular disc surface and the generation of a signal indicative of the boundary of the current servo frame. In some embodiments, the FRAME OFFSET VALUE provided as an input to the frame counter 540 is different for each data head and disc surface combination, and is updated upon each head switch.

In some embodiments of the present invention, the control circuitry 160 generates a second output signal which is indicative of when data being read by the selected data head is servo data. In these embodiments the control circuitry includes a reference counter 530 which counts clock cycles between reading data from a first servo spoke and reading data from a second servo spoke. The reference counter provides a reference counter output 551 as a function of a number of clock cycles counted between servo spokes. A reference comparator 550 compares the reference counter output to a TARGET VALUE and provides as an output a signal 553 which is indicative of when data being read by the selected data head is servo data. In some embodiments, the reference comparator output 553 is operatively coupled to a reference counter reset input 554 which resets the reference counter 530 when the reference comparator output signal is indicative of a first boundary of a servo spoke.

The timing mark detection output signal 521 is also provided as an input 531 to the reference counter such that upon the detection of a timing mark data pattern the count value of the reference counter provided at the reference counter output 551 is set to a PRESET VALUE received at a preset value input 532 to the reference counter. In some embodiments, the PRESET VALUE provided as an input to the reference counter is a constant for each data head and disc surface combination. The TARGET VALUE is preferably a constant nominal value for all head and disc surface combinations until the occurrence of a head switch. After a head switch, the TARGET VALUE is changed from the constant nominal value to a variable value until servo data from a servo spoke is read. Once servo data from a servo spoke is read after the head switch, the TARGET VALUE is changed back to the constant nominal value.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is at times described as a disc drive data storage system, it will be appreciated by those skilled in the art that the teachings of the present invention can be applied to other systems and apparatus, such as optical storage systems, without departing from the scope and spirit of the present invention.

What is claimed is:

1. A headerless format disc drive comprising:

a disc stack including a plurality of coaxially arranged data storage discs providing a plurality of disc surfaces, wherein a plurality of rotationally spaced apart servo frames are defined for the disc stack;

servo data written on the plurality of disc surfaces within radially extending servo spokes such that each disc surface includes one servo spoke within each servo frame, and such that within each paticular servo frame the servo spokes on each of the plurality of disc surfaces are offset rotationally from one another;

a plurality of data heads, wherein each of the plurality of data heads is supported by an actuator assembly adjacent a corresponding one of the plurality of disc surfaces, wherein a selected first of the plurality of data heads reads data from its corresponding disc surface until a head switch occurs, and wherein after the head switch occurs a selected second of the plurality of data heads reads data from its corresponding dics surface; and control circuitry operatively coupled to the plurality of data heads and receiving the data read by the selected first data head, and after the head switch receiving the data read by the selected second data head, the control circuitry generating as a first output a first signal which is indicative of boundaries of the respective servo frames.

2. The headerless format disc drive of claim 1, wherein the control circuitry comprises:

a frame counter which counts clock cycles during a current frame and provides a frame counter output as a function of a number of clock cycles counted during the current frame; and a frame comparator which compares the frame counter output to a frame period value which is constant for all frames, the frame comparator providing as an output a signal which is representative of the first signal and which is thereby indicative of the boundaries of the current servo frame.

3. The headerless format disc drive of claim 2, wherein the frame comparator output is operatively coupled to a frame counter reset input which resets the frame counter when the frame comparator output signal is indicative of an end of the current servo frame and the beginning of the next servo frame.

4. The headerless format disc drive of claim 3, wherein the control circuitry further comprises a timing mark detector which receives the data read by the selected first data head, and after the head switch receives the data read by the selected second data head, the timing mark detector providing a timing mark detection output signal upon detection of a timing mark data pattern in any of the servo spokes.

5. The headerless format disc drip of claim 4, wherein the timing mark detection signal is provided as an input to the frame counter such that upon the detection of a timing mark data pattern the count value of the frame counter provided at the frame counter output is set to a frame offset value received at a frame offset input to the frame counter, wherein the frame offset value is indicative of an expected offset time between detection of the timing mark data pattern within a servo spoke for a particular disc surface and the generation of the first signal indicative of the boundary of the current servo frame.

6. The headerless format disc drive of claim 5, wherein the frame offset value provided as an input to the frame counter is different for each data head and disc surface combination, and wherein the frame offset value is updated upon each head switch.

7. The headerless format disc drive of claim 2, wherein the control circuitry also generates at a second output a second output signal which is indicative of when data being read by the selected data head is serve data, the control circuitry further comprising:

a reference counter which counts clock cycles between reading data from a first servo spoke and reading data from a second servo spoke, the reference counter providing a reference counter out put as a function of a number of clock cycles counted between servo spokes; and a reference comparator which compares the reference counter output to a target value, the reference comparator providing as an output a signal which is representative of the second signal and which is thereby indicative of when data being read by the selected data head is servo data.

8. The headerless format disc drive of claim 7, wherein the reference comparator output is operatively coupled to a reference counter reset input which resets the reference counter when the reference comparator output signal is indicative of a first boundary of a servo spoke.

9. The headerless format disc drive of claim 8, wherein the timing mark detection output signal is provided as an input to the reference counter such that upon the detection of a timing mark data pattern the count value of the reference counter provided at the reference counter output is set to a preset value received at a preset value input to the reference counter, wherein the preset value is indicative of an expected time between the beginning of a signal pulse in the second output signal and detection of the next timing mark.

10. The headerless format disc drive of claim 9, wherein the preset value provided as an input to the reference counter is a constant for each data head and disc surface combination.

11. The headerless format disc drive of claim 10, wherein the target value provided to the reference counter is a constant nominal value for all head and disc surface combinations, and wherein upon the occurrence of a head switch the target value is changed from the constant nominal value to a variable value until servo data from a servo spoke is read, and wherein once servo data from a servo spoke is read after the head switch the target value is changed back to the constant nominal value.

12. A method of generating servo reference signals using servo control circuitry of a disc drive, the disc drive including a plurality of coaxially arranged data storage discs providing a plurality of disc surfaces having a plurality of rotationally spaced apart servo frames defined thereon, the disc drive also including servo data written on the plurality of disc surfaces within radially extending servo spokes such that each disc surface includes only one servo spoke within each servo frame, and such that within each particular servo frame the servo spokes on each of the plurality of disc surfaces are of set rotationally from one another, the method comprising:

(a) receiving first signals, corresponding to data read from a first disc surface using a first data head, until a first head switch occurs;

(b) after the head switch occurs, receiving second signals corresponding to data read from a second disc surface using a second data head; and (c) generating servo reference signals as a function of the received first and second signals.

13. The method of claim 12, wherein generating step (c) further comprises:

(c)(1) generating with a frame counter a frame counter output indicative of a number of clock cycles occurring during a current frame; and (c)(2) comparing with a frame comparator the frame counter output to a frame period value which is constant for all frames and providing as a frame comparator output a first servo reference signal which is indicative of the boundaries of the current servo frame.

14. The method of claim 13, wherein generating step (c) further comprises:

(c)(3) detecting a timing mark data pattern in either of the first and second signals corresponding to the data read from the first and second disc surfaces; and (c)(4) upon detection of a timing mark data pattern, setting the frame counter output to a frame offset value indicative or an expected offset time between detection of the timing mark data pattern within a servo spoke for a particular disc surface and the generation of the servo reference signal indicative of the boundary of the current servo frame, wherein the frame offset value is different for each disc surface and is updated upon each head switch.

15. The method of claim 14, wherein generating step (c) further comprises:

(c)(5) counting with a reference counter a number of clock cycles occurring between reading data from a first servo spoke and reading data from a second servo spoke, and providing a reference counter output as a function of a number of clock cycles counted between servo spokes; and (c)(6) comparing with a reference comparator the reference counter output and a target value, and providing at a reference comparator output a second servo reference signal which is indicative of when data being read by the selected data head is servo data.

16. The method of claim 15, wherein generating step (c) further comprises the step (c)(7) of upon detecting the timing mark data pattern, setting the reference counter output to a preset value received at a preset value input to the reference counter, wherein the preset value is indicative of an expected time between the beginning of a signal pulse in the second servo reference signal and detection of the next timing mark.

17. The method of claim 16, wherein the preset value provided as an input to the reference counter is a constant for each data head and disc surface combination.

18. The method of claim 17, wherein the target value provided to the reference counter is a constant nominal value for all head and disc surface combinations, and wherein upon the occurrence of a head switch the target value is changed from the constant nominal value to a variable value until servo data from a servo spoke is read, and wherein once servo data from a servo spoke is read after the head switch the target value is changed back to the constant nominal value.

* * * * *

UNITED STATES PATENT AND TRADEMARK OFFICE
CERTIFICATE OF CORRECTION

PATENT NO. : 6,208,480 B1
DATED : March 27, 2001
INVENTOR(S) : Steven C. Tigner

It is certified that error appears in the above-identified patent and that said Letters Patent is hereby corrected as shown below:

Column 9,
Line 26, delete "dics" and insert -- disc --.
Line 60, delete "drip" and insert -- drive --.

Column 10,
Line 13, delete "serve" and insert -- servo --
Line 18, delete "out put" and insert -- output --.
Line 62, delete "of set" and insert --offset --.

Column 11,
Line 23, delete "or" and insert -- of --.

Signed and Sealed this

Eleventh Day of December, 2001

*Attest:*

NICHOLAS P. GODICI
*Attesting Officer*  *Acting Director of the United States Patent and Trademark Office*